US009009543B2

(12) United States Patent
Chang et al.

(10) Patent No.: US 9,009,543 B2
(45) Date of Patent: Apr. 14, 2015

(54) COMPUTER SYSTEMS THAT ACQUIRE A PLURALITY OF STATUSES OF NON-NORMALLY OPERATING HARD DISK DRIVES

(71) Applicants: Inventec (Pudong) Technology Corporation, Shanghai (CN); Inventec Corporation, Taipei (TW)

(72) Inventors: Hsueh-Jen Chang, Taipei (TW); Huang-Ching Wang, Taipei (TW)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 178 days.

(21) Appl. No.: 13/798,777

(22) Filed: Mar. 13, 2013

(65) Prior Publication Data

US 2014/0136904 A1    May 15, 2014

(30) Foreign Application Priority Data

Nov. 14, 2012    (CN) .......................... 2012 1 0455550

(51) Int. Cl.
*G06F 11/00*    (2006.01)
*G06F 11/30*    (2006.01)
(52) U.S. Cl.
CPC ........ *G06F 11/3031* (2013.01); *G06F 11/3034* (2013.01); *G06F 11/3055* (2013.01)
(58) Field of Classification Search
CPC .............................. G06F 11/00; G06F 11/3055

USPC ........................................................... 714/48
See application file for complete search history.

(56) References Cited

U.S. PATENT DOCUMENTS

| 7,051,215 | B2* | 5/2006 | Zimmer et al. ............... 713/300 |
| 8,693,136 | B2* | 4/2014 | Yang et al. .................. 360/97.19 |
| 2010/0306434 | A1* | 12/2010 | Dube et al. ..................... 710/300 |
| 2012/0030492 | A1* | 2/2012 | Yu et al. ......................... 713/324 |
| 2013/0080697 | A1* | 3/2013 | Dhandapani et al. ......... 711/114 |
| 2014/0006676 | A1* | 1/2014 | Chandrasekhar et al. .... 710/316 |

* cited by examiner

*Primary Examiner* — Scott Baderman
*Assistant Examiner* — Joseph Kudirka
(74) *Attorney, Agent, or Firm* — Tim Tingkang Xia, Esq.; Morris, Manning & Martin, LLP

(57) ABSTRACT

A computer system includes multiple hard disk devices, a hard disk device backplane, an information management unit, a middle backplane and multiple motherboards. The hard disk device backplane is coupled to and configured to manage the hard disk devices. The information management unit, coupled to the hard disk device backplane, is configured to acquire statuses of the hard disk devices. The middle backplane is coupled to the hard disk device backplane. The motherboards, coupled to the information management unit and the middle backplane, respectively have a baseboard management controller. When the operating system is loaded for operation on the motherboards, the baseboard management controllers are coupled to the hard disk device backplane via the middle backplane to acquire the statuses of the hard disk devices. When the motherboards are not operated normally, the baseboard management controllers acquire the statuses of the hard disk devices via the information management unit.

10 Claims, 2 Drawing Sheets

COMPUTER SYSTEMS THAT ACQUIRE A PLURALITY OF STATUSES OF NON-NORMALLY OPERATING HARD DISK DRIVES

CROSS-REFERENCE TO RELATED APPLICATIONS

This non-provisional application claims priority under 35 U.S.C. §119(a) on Patent Application No(s). 201210455550.3 filed in China on Nov. 14, 2012, the entire contents of which are hereby incorporated by reference.

BACKGROUND OF THE DISCLOSURE

1. Technical Field of the Disclosure

This disclosure relates to a computer system, and more particularly to a computer system having a plurality of hard disk devices.

2. Description of the Related Art

Manufacturers of computer systems, especially those of servers, often assemble a different number of motherboards in the computer systems in order to meet the requirements of customers. Regardless how many motherboards are assembled in a computer system, they will share only one hard disk device backplane. Furthermore, the hard disk device backplane is connected with a plurality of hard disk devices, to allocate the hard disk device for each motherboard.

With respect to existing technology, each motherboard may communicate with the hard disk device backplane when the operating system is loaded for operation, and using the corresponding hard disk devices. When communicating with the hard disk device backplane, the motherboard also acquires the statuses of these hard disk devices. However, when the motherboard does not operate normally, the user cannot acquire the statuses of these hard disk devices through the motherboard. Additionally, in the case that the statuses cannot be acquired, the user cannot process in time when the hard disk devices do not operate normally, causing an abnormal operation of the computer system and thus affecting the performance of the computer system.

SUMMARY OF THE DISCLOSURE

An embodiment of the disclosure provides a computer system which comprises a plurality of hard disk devices, a hard disk device backplane, an information management unit, a middle backplane, a plurality of motherboards. The hard disk device backplane is coupled to the plurality of hard disk devices and is configured to manage the plurality of hard disk devices. The information management unit, coupled to the hard disk device backplane, is configured to acquire a plurality of statuses of the plurality of hard disk devices. The middle backplane is coupled to the hard disk device backplane. The plurality of motherboards have a baseboard management controller and are coupled to the information management unit and the middle backplane, respectively. When the operating system is loaded for operation on the motherboards, the baseboard management controller of each of the plurality of motherboards is coupled to the hard disk device backplane via the middle backplane so as to acquire the plurality of statuses of the hard disk devices. When the plurality of motherboards are not operated normally, the baseboard management controller of each of the plurality of motherboards acquires the plurality of statuses of the hard disk devices via the information management unit.

Another embodiment of the disclosure provides a computer system comprising a plurality of hard disk devices, a hard disk device backplane, a plurality of motherboards, a plurality of fans and a fan control unit. The hard disk device backplane is coupled to the plurality of hard disk devices to manage the plurality of hard disk devices. The middle backplane is coupled to the hard disk device backplane. The plurality of motherboards have a baseboard management controller, respectively. The plurality of motherboards are coupled to the information management unit and the middle backplane. The plurality of fans corresponds to the plurality of motherboards and the plurality of hard disk devices, respectively. The fan control unit, coupled to the hard disk device backplane and the baseboard management controllers of the plurality motherboards, are configured to acquire a plurality of statuses of the plurality of hard disk devices and the plurality of motherboards. The fan control unit controls a plurality of statuses of the plurality of fans in accordance with the plurality of statuses of the plurality of motherboards and those of the plurality of hard disk devices. When the operating system is loaded for operation on the plurality of motherboards, the baseboard management controller of each of the plurality of motherboards is coupled to the hard disk device backplane via the middle backplane so as to acquire the plurality of statuses of the plurality of hard disk devices. When the plurality of motherboards are not operated normally, the baseboard management controller of each of the plurality of motherboards acquires the plurality of statuses of the hard disk devices via the fan control unit.

BRIEF DESCRIPTION OF THE DRAWINGS

The disclosure will become more fully understood from the detailed description given herein below for illustration only, thus does not limit the disclosure, wherein.

DETAILED DESCRIPTION

Figure 1:
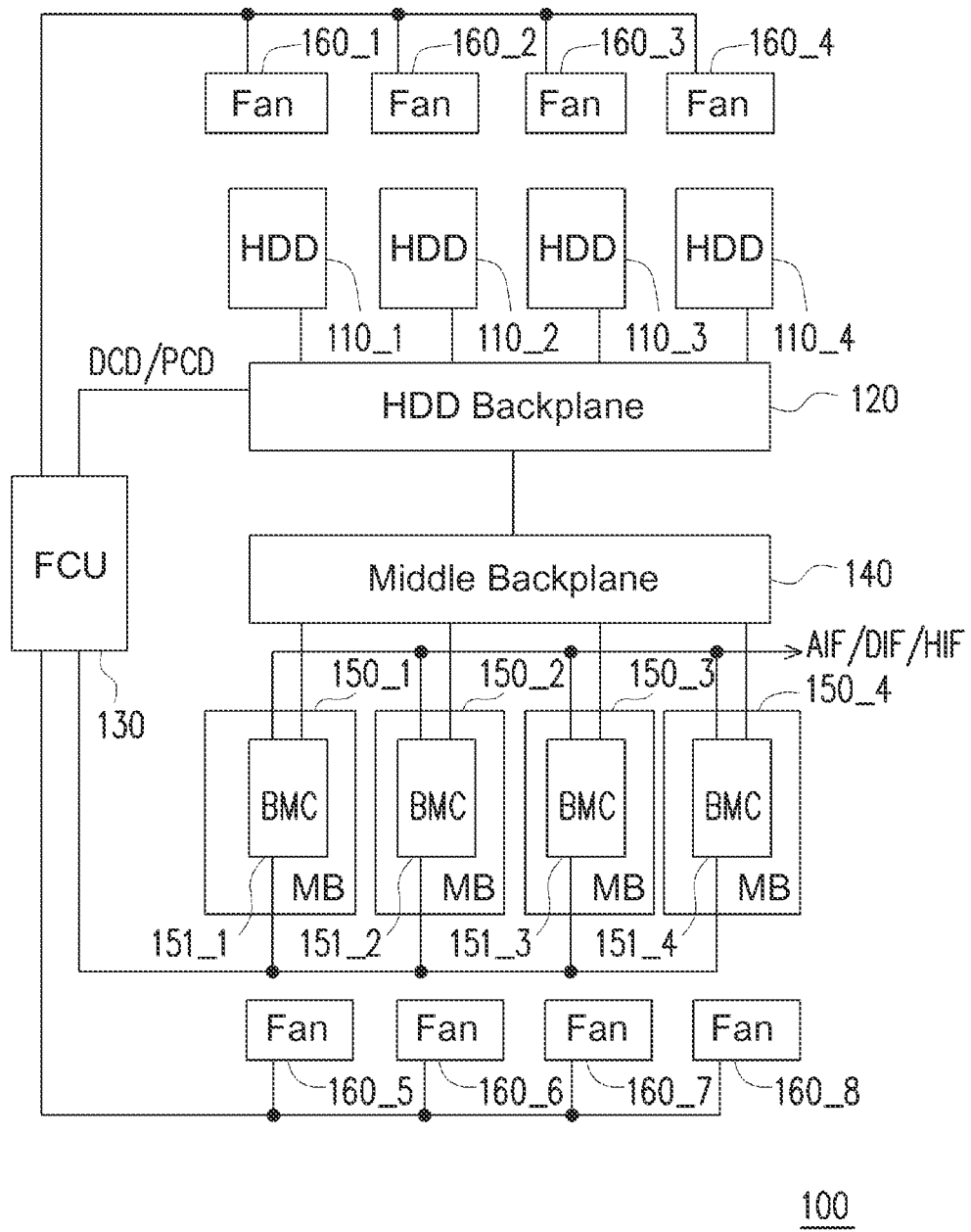
FIG. 1 is a schematic view of a computer system according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a schematic view of a computer system according to one embodiment of the disclosure. Please refer to FIG. 1, in this embodiment, a computer system 100 comprises a plurality of hard disk devices (HDD, for example, four hard disk devices 110_1~110_4 are provided here), a hard disk device backplane 120 (HDD backplane), a fan control unit (FCU) 130, a middle backplane 140, a plurality of motherboards (MB, for example, four motherboards 150_1~150_4 are provided here), and a plurality of fans (for example, eight fans 160_1~160_8 are provided here).

The hard disk device backplane 120 is coupled to the plurality of hard disk devices 110_1~110_4 in order to manage them (the plurality of hard disk devices 110_1~110_4). The middle backplane 140 is coupled to the hard disk device backplane 120. The plurality of motherboards 150_1~150_4 respectively have a baseboard management controller (BMC) 151_1~151_4, that are coupled to the middle backplane 140.

The fan control unit 130 is coupled to the hard disk device backplane 120, to acquire the statuses of the plurality of hard disk devices 110_1~110_4 via the hard disk device backplane 120. The fan control unit 130 is coupled to the plurality of baseboard management controllers 151_1~151_4 of the plurality of motherboards 150_1~150_4.

When the operating system is loaded for operation on the plurality of motherboards (e.g., 150_1~150_4), the baseboard management controller (e.g., 151_1~151_4) of each of the plurality of motherboards (e.g., 150_1~150_4) will load corresponding drivers (namely, driving program) for the hard disk device backplane 120 and the middle backplane 140. At this moment, the plurality of baseboard management controllers (e.g., 151_1~151_4) may communicate with the hard disk device backplane 120 via the middle backplane 140, the same as being coupled to the hard disk device backplane 120 via the middle backplane 140. Therefore, the plurality of baseboard management controllers (e.g., 151_1~151_4) acquire a plurality of statuses of the hard disk devices 110_1~110_4 from the hard disk device backplane 120, and obtaining the read and write access to at least one of the plurality of hard disk devices 110_1~110_4.

On the other hand, the computer system 100 has been provided with an alternate current (AC) power supply. When the plurality of motherboards (e.g., 150_1~150_4) are not operated normally (e.g., the motherboards cannot load the operating system completely, entering a dormant status or during the start-up), the baseboard management controller (e.g., 151_1~151_4) of each motherboard (e.g., 150_1~150_4) will not load the drivers for the hard disk device backplane 120 and the middle backplane 140, and thus the plurality of baseboard management controllers (e.g., 151_1~151_4) cannot communicate with the middle backplane 140 and the hard disk device backplane 120. At this time, the plurality of baseboard management controllers (e.g., 151_1~151_4) are enabled when provided with the AC power supply, while the fan control unit 130 and the hard disk device backplane 120 are provided with, for example, a 12V voltage during the start-up, so that the fan control unit 130 belongs to the first batch of elements supplied with a voltage (generally, the voltage supplied in an order, for example, 12V-5V-3V-1.5V). Therefore, the plurality of statuses of the plurality of hard disk devices 110_1~110_4 are acquired via the fan control unit 130.

Furthermore, when receiving the plurality of statuses of the plurality of hard disk devices 110_1~110_4 for the first time, the fan control unit 130 transmits the plurality of statuses to the plurality of baseboard management controllers 151_1~151_4, to be stored therein. Then, the fan control unit 130 transmits the plurality of statuses of the hard disk devices 110_1~110_4 to the plurality of baseboard management controllers 151_1~151_4 when the plurality of statuses are changed, so as to update the status of each hard disk device 110_1~110_4 stored in the corresponding baseboard management controllers 151_1~151_4.

Generally, some elements (e.g., the hard disk device backplane 120, the fan control unit 130 and the middle backplane 140) are not directly related to the operating of the users, so the above-mentioned elements may begin to operate while the computer system 100 is supplied with an external power source (e.g., mains power). On the other hand, other elements (e.g., the plurality of hard disk devices 110_1~110_4 and the plurality of motherboards 150_1~150_4) are directly related to the operating of the users, so these elements may begin to operate only when they receive the operating command from the users. Based on the above description, when the plurality of hard disk devices 110_1~110_4 are not operated, the hard disk device backplane 120 cannot receive the signal from the plurality of hard disk devices 110_1~110_4, thereby determining that the plurality of hard disk devices 110_1~110_4 are not in operation. Additionally, when one of the plurality of motherboards 150_1~150_4 loads the operating system in accordance with the operating command of the users and begins to operate, the computer system 100 will start the plurality of hard disk devices 110_1~110_4. At this time, the hard disk device backplane 120 receives a signal from the plurality of hard disk devices 110_1~110_4, thereby determining the plurality of statuses of the plurality of hard disk devices 110_1~110_4.

After acquiring the status of each hard disk device 110_1~110_4, the baseboard management controller (e.g., 151_1~151_4) of each motherboard (e.g., 150_1~150_4) generates an event log in accordance with the corresponding status of each hard disk device 110_1~110_4, to record a status changing of each hard disk device 110_1~110_4. Furthermore, when the hard disk device (e.g., 110_1~110_4) are not operated normally, the baseboard management controller (e.g., 151_1~151_4) of each motherboard (e.g., 150_1~150_4) sends an alert information message AIF to the user via a communication interface (e.g., Inter-Integrated Circuit (I2C), Short Message Service (SMS), Intelligent Platform Management Interface Over Lan (IOL) or Remote Management Control Protocol (RMCP) interface) between the user and the computer system 100.

In addition, when each hard disk device (e.g., 110_1~110_4) is not operated normally, the baseboard management controller (e.g., 151_1~151_4) of each motherboard (e.g., 150_1~150_4) manages the corresponding hard disk device (e.g., 110_1~110_4) via the fan control unit 130 in accordance with an operating policy, and provides relevant information for the user via the above-mentioned communication interface. Furthermore, when each hard disk device (e.g., 110_1~110_4) is not operated normally, the baseboard management controller (e.g., 151_1~151_4) of each motherboard (e.g., 150_1~150_4) sends a diagnosis command DCD to the hard disk device backplane 120 via the fan control unit 130, so as to diagnose the statuses of the abnormal hard disk devices (e.g., 110_1~110_4) or all of the plurality of hard disk devices, and provides a diagnose information message DIF for the user. Alternatively, when each hard disk device (e.g., 110_1~110_4) is not operated normally, the baseboard management controller (e.g., 151_1~151_4) of each motherboard (e.g., 150_1~150_4) sends a power off command PCD to the hard disk device backplane 120 via the fan control unit 130, in order to shut down the abnormal hard disk devices (e.g., 110_1~110_4) and provide a management information message HIF for the user.

In one of the embodiments of this disclosure, when the information (e.g., the alert information message AIF, the diagnosis information DIF or the management information message HIF) is supplied, the user may remotely monitor the current status of the plurality of hard disk devices (e.g., 110_1~110_4).

Furthermore, when coupled to the baseboard management controllers 151_1~151_4 of the motherboards 150_1~150_4, the fan control unit 130 is configured to acquire the plurality of statuses of the plurality of motherboards 150_1~150_4 via the plurality of baseboard management controllers 151_1~151_4. Additionally, the fan control unit 130 is coupled to the plurality of fans 160_1~160_8.

When the plurality of statuses of the motherboards 150_1~150_4 and the hard disk devices 110_1~110_4 are received, the fan control unit 130 manages the plurality of statuses of the plurality of fans 160_1~160_8 in accordance with the plurality of statuses of the plurality of motherboards 150_1~150_4 and the plurality of hard disk devices 110_1~110_4. That is, in this embodiment, the fans 160_1~160_8 are in a one-to-one relationship with the corresponding hard disk devices 110_1~110_4 and the corresponding motherboards 150_1~150_4, namely, the fan 160_1 is corresponding to the hard disk device 110_1, the fan 160_2 is corresponding to the hard disk device 110_2, and the rest can be figured out in accordance with the drawings. As a consequence, the fan control unit 130 manages the status of the fan 160_1 in accordance with the status of the hard disk device 110_2, and the rest can be deduced by analogy.

In this embodiment, the plurality of fans 160_1~160_8 are in a one-to-one relationship with the hard disk devices 110_1~110_4 or the motherboards 150_1~150_4, but the relationship does not limit the disclosure. In other embodiments, the plurality of fans 160_1~160_8 may be in a many-to-one or one-to-many relationship with the plurality of hard disk devices 110_1~110_4 or the plurality of motherboards 150_1~150_4, depending on the actual configuration of the computer system 100 and the circuit design, but the embodiments of this disclosure are not limited to this. Furthermore, the fan control unit (e.g., 130) manages the status of each fan (e.g., 160_1~160_8) in accordance with the status of the element corresponding to each fan (e.g., 160_1~160_8).

In one of the embodiments of this disclosure, the coupling surface between the hard disk device backplane 120 and the fan control unit 130 is a Universal Asynchronous Receiver Transmitter (UART) interface, and that between the fan control unit 130 and the baseboard management controllers 151_1~151_4 of the motherboards 150_1~150_4 is an Intelligent Platform Management Bus (IPMB), but the embodiments of this disclosure are not limited thereto.

Figure 2:
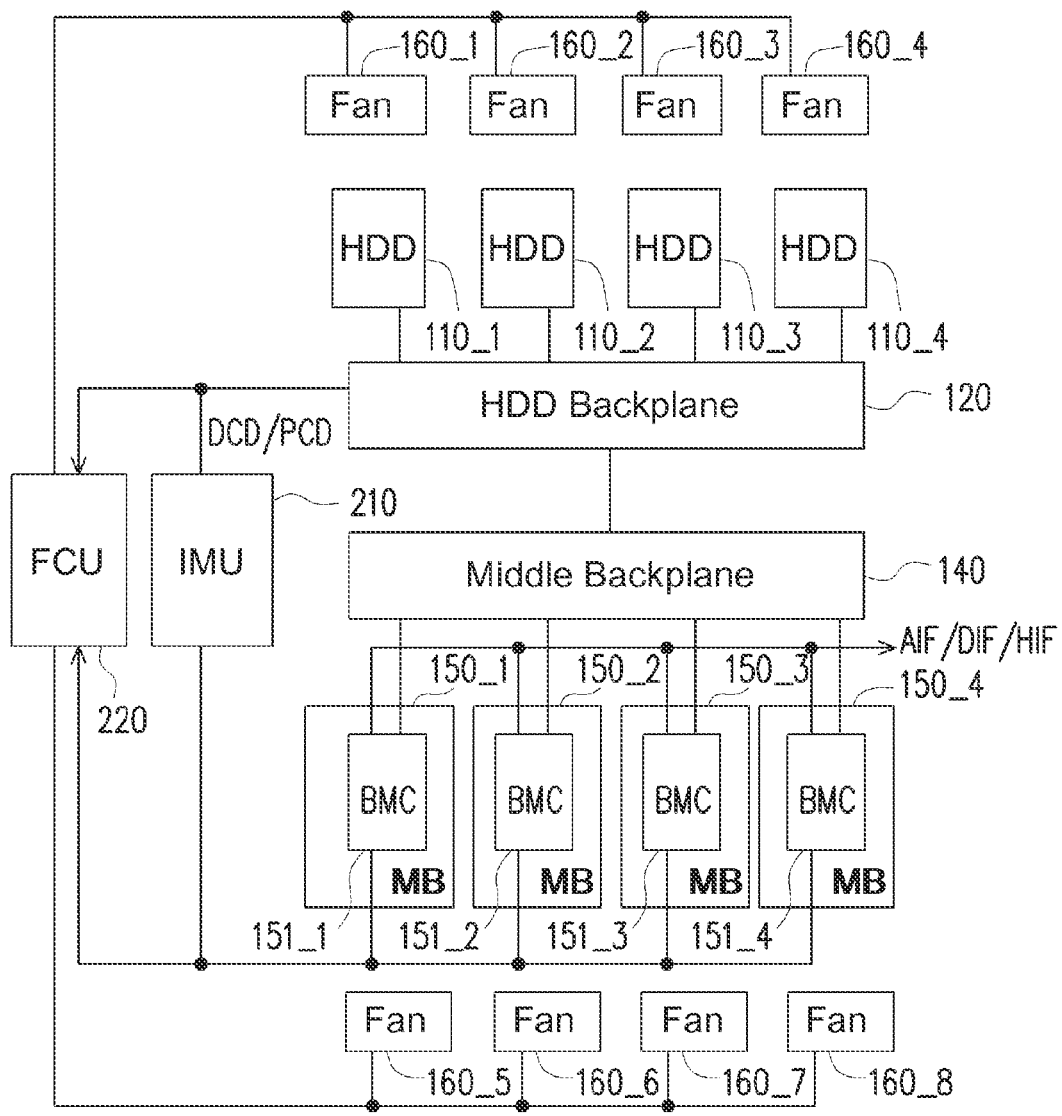
FIG. 2 is a schematic view of a computer system according to another embodiment of the disclosure.

FIG. 2 is a schematic drawing for the computer system in accordance with another embodiment of this disclosure. Please refer to FIGS. 1 and 2, the difference between them lies in an information management unit (IMU) 210 and a fan control unit (FCU) 220, and that the same or similar components use the same or similar reference signs.

In this embodiment, the information management unit 210, coupled to the hard disk device backplane 120, is configured to acquire the plurality of statuses of the plurality of hard disk devices 110_1~110_4 via the hard disk device backplane 120. The fan control unit 130 is coupled to the plurality of baseboard management controllers 151_1~151_4 of the plurality of motherboards 150_1~150_4. When each motherboard (e.g., 150_1~150_4) is not operated normally, the baseboard management controller (e.g., 151_1~151_4) of each motherboard (e.g., 150_1~150_4) may acquire the current status of the hard disk devices 110_1~110_4 via the information management unit 210.

Furthermore, when receiving the plurality of statuses of the plurality of hard disk devices 110_1~110_4 for the first time, the information management unit 210 transmits them to the plurality of baseboard management controllers 151_1~151_4, to be stored therein. Then, the information management unit 210 transmits the plurality of statuses of the plurality of hard disk devices 110_1~110_4 to the plurality of baseboard management controllers 151_1~151_4 when the plurality of statuses are changed, so as to update the plurality of statuses (namely, the status changing) of the plurality of hard disk devices 110_1~110_4 stored in the baseboard management controllers 151_1~151_4.

In addition, when each hard disk device (e.g., 110_1~110_4) is not operated normally, the baseboard management controller (e.g., 151_1~151_4) of each motherboard (e.g., 150_1~150_4) sends an command (e.g., a diagnosis command DCD or a power off command PCD) via the information management unit 210 in accordance with an operating policy, in order to manage the abnormal hard disk devices (e.g., 110_1~110_4), and provides relevant information (the diagnosis information DIF or the power off information HIF) for the user via the above-mentioned communication interface.

The fan control unit 220, coupled to the hard disk device backplane 120, is configured to acquire the plurality of statuses of the plurality of hard disk devices 110_1~110_4 via the hard disk device backplane 120. The fan control unit 220 is coupled to the plurality of baseboard management controllers 151_1~151_4 of the plurality of motherboards 150_1~150_4, in order to acquire the plurality of statuses of the motherboards 150_1~150_4 via the plurality of baseboard management controllers 151_1~151_4. Furthermore, the fan control unit 220 is coupled to the plurality of fans 160_1~160_8. When receiving the plurality of statuses of the plurality of motherboards 150_1~150_4 and the plurality of hard disk devices 110_1~110_4, the fan control unit 220 is configured to manage the plurality of statuses of the plurality of fans 160_1~160_8 in accordance with the plurality of statuses of the plurality of motherboards 150_1~150_4 and the plurality of hard disk devices 110_1~110_4.

As a consequence of the above, for the computer system of the embodiments of this disclosure, when the motherboard operates normally, the baseboard management controller of motherboard acquires the plurality of statuses of the plurality of hard disk devices via the hard disk device backplane. When the motherboard does not operate normally, the baseboard management controller of the motherboard acquires the plurality of statuses of the plurality of hard disk devices via the information management unit or the fan control unit, so that the users can monitor the plurality of statuses of the plurality of hard disk devices. Furthermore, when the baseboard management controller of the motherboard acquires the plurality of statuses of the plurality of hard disk devices via the fan control unit, the circuit design of the computer system is simplified.

What is claimed is:
1. A computer system, comprising:
a plurality of hard disk devices;
a hard disk device backplane coupled to and configured to manage the plurality of hard disk devices;
an information management unit coupled to the hard disk device backplane and configured to obtain a plurality of statuses of the plurality of hard disk devices;
a middle backplane coupled to the hard disk device backplane; and
a plurality of motherboards, each of the plurality of motherboards having a baseboard management controller and coupled to the information management unit and the middle backplane, respectively, wherein, when an operating system is loaded for operation on the motherboards, the baseboard management controller of each of the plurality of motherboards is coupled to the hard disk device backplane via the middle backplane so as to obtain the plurality of statuses of the hard disk devices, and when the plurality of motherboards are not operated normally, the baseboard management controller of each of the plurality of motherboards acquires the plurality of statuses of the hard disk devices via the information management unit.

2. The computer system according to claim 1, wherein the baseboard management controller of each of the plurality of motherboards generates an event log in accordance with the plurality of statuses of the hard disk devices, to record a status changing of the hard disk devices.

3. The computer system according to claim 1, wherein, when the plurality of hard disk devices are not operated normally, the baseboard management controller of each of the plurality of motherboards sends an alert information message.

4. The computer system according to claim 1, wherein:
when the plurality of hard disk devices are not operated normally, the baseboard management controller of each of the plurality of motherboards manages the plurality of hard disk devices not operated normally via the information management unit in accordance with an operating policy, and the baseboard management controller of each of the plurality of motherboards provides relevant information for a user;
when the plurality of hard disk devices are not operated normally, the baseboard management controller of each of the plurality of motherboards sends a diagnose command to the hard disk device backplane via the information management unit in order to diagnose the plurality of statuses of the plurality of hard disk devices, and the baseboard management controller of each of the plurality of motherboards provides a diagnose information message for the user; and
alternatively, the plurality of baseboard management controllers of the plurality of motherboards send a power off command to the hard disk device backplane via the information management unit, in order to shut down the plurality of hard disk devices not operated normally and provide a management information message.

5. The computer system according to claim 1, wherein the information management unit is a fan control unit, the computer system further comprises a plurality of fans corresponding to the plurality of motherboards and the plurality of hard disk devices, respectively, and the fan control unit controls a plurality of statuses of the plurality of fans based on the plurality of statuses of a plurality of motherboards and the plurality of statuses of the hard disk devices.

6. The computer system according to claim 1, further comprising:
a plurality of fans corresponding to the plurality of motherboards and the plurality of hard disk devices, respectively; and
a fan control unit coupled to the hard disk device backplane and the plurality of the baseboard management controllers of the plurality of motherboards, and configured to obtain the plurality of statuses of the plurality of hard disk devices and a plurality of statuses of the plurality of motherboards, and wherein the fan control unit controls a plurality of statuses of the plurality of fans in accordance with the plurality of statuses of the plurality of motherboards and the plurality of statuses of the hard disk devices.

7. A computer system, comprising:
a plurality of hard disk devices;
a hard disk device backplane coupled to the plurality of hard disk devices to manage the plurality of hard disk devices;
a middle backplane coupled to the hard disk device backplane;
a plurality of motherboards each having a baseboard management controller, respectively, and the plurality of motherboards coupled to the information management unit and the middle backplane;
a plurality of fans corresponding to the plurality of motherboards and the plurality of hard disk devices, respectively; and
a fan control unit coupled to the hard disk device backplane and the plurality of baseboard management controllers of the plurality of motherboards, and configured to obtain a plurality of statuses of the plurality of hard disk devices and a plurality of statuses of the plurality of motherboards, wherein the fan control unit controls a plurality of statuses of the plurality of fans in accordance with the plurality of statuses of the plurality of motherboards and the plurality of statuses of the plurality of hard disk devices;
wherein, when an operating system is loaded for operation on the plurality of motherboards, the baseboard management controller of each of the plurality of motherboards is coupled to the hard disk device backplane via the middle backplane so as to obtain the plurality of statuses of the plurality of hard disk devices, and when the plurality of motherboards are not operated normally, the baseboard management controller of each of the plurality of motherboards obtains the plurality of statuses of the hard disk devices via the fan control unit.

8. The computer system according to claim 7, wherein the baseboard management controller of each of the plurality of motherboards generates an event log in accordance with the plurality of statuses of the hard disk devices, so as to record a status changing of the plurality of hard disk devices.

9. The computer system according to claim 7, wherein, when the plurality of hard disk devices are not operated normally, the baseboard management controller of each of the plurality of motherboards sends an alert information message.

10. The computer system according to claim 7, wherein:
when the plurality of hard disk devices are not operated normally, the baseboard management controller of each of the plurality of motherboards manages the plurality of hard disk devices via the fan control unit in accordance with an operating policy, and the baseboard management controller provides relevant information;
when the hard disk devices are not operated normally, the baseboard management controller of each of the plurality of motherboards sends a diagnosis command to the hard disk device backplane via the fan control unit so as to diagnose the plurality of statuses of the plurality of hard disk devices, and provides a diagnosis information message; and
alternatively, the plurality of baseboard management controllers of the plurality of motherboards send a power off command to the hard disk device backplane via the fan control unit, in order to shut down the hard disk devices not operated normally and provide a management information message.

* * * * *